United States Patent [19]

Fukuoka et al.

[11] Patent Number: 5,132,072
[45] Date of Patent: Jul. 21, 1992

[54] MOLDING METHOD OF CERAMIC BODY

[75] Inventors: Osamu Fukuoka; Tatsumi Maeda; Toshiyuki Akamatsu; Kazuto Matsukami, all of Kokubu, Japan

[73] Assignee: Kyocera Corporation, Kyoto, Japan

[21] Appl. No.: 647,284

[22] Filed: Jan. 29, 1991

[51] Int. Cl.$^5$ .............................................. C04B 33/28
[52] U.S. Cl. ...................................... 264/319; 264/63; 264/86; 264/328.2
[58] Field of Search .................. 264/63, 86, 319, 328.2

[56] References Cited

U.S. PATENT DOCUMENTS 3,330,892  7/1967  Hermann ............................... 264/63

FOREIGN PATENT DOCUMENTS 62-257807  11/1987  Japan .
62-289347  12/1987  Japan .
63-30202   2/1988   Japan .

Primary Examiner—James Derrington
Attorney, Agent, or Firm—Spensley Horn Jubas & Lubitz

[57] ABSTRACT

A molding method of ceramic body comprising the following steps of:
preparing a ceramic slurry by adding, to ceramic raw material powders, a solvent, organic dispersant and caking agent and mixing them altogether; casting said ceramic slurry into a mold; cooling it to a temperature lower than the melting point of said caking agent; and taking it out of the mold.

This molding method is capable of dissolving cracking generation during releasing the ceramic body from a mold, facilitating machining, decreasing the binder amount of organic compounds, diminishing a firing shrinkage and obtaining a higher dimension accuracy.

3 Claims, No Drawings

MOLDING METHOD OF CERAMIC BODY

BACKGROUND OF THE INVENTION

1. Field of the Invention

The present invention relates to the improvement of the molding method of unfired ceramic body.

2. Prior Art

In recent years, a number a ceramic bodies have been applied to mechanical components such as an engine and gas turbine, structural members of a chemical plant and the like, and in addition also to ornamental parts of a watch, accessories and the like.

However, many of the engine mechanical components, plant stractural members and ornamental parts have complicated three dimentional structures. In spite of the fact that ceramic materials are superior in heat resistance, corrosion resistance and abrasion resistance, have a higher strength and comparatively light weight, they have difficulty in machining performance, especially in acquirement of molded body having a shape of the three dimensional structure. For acquirement of complicately shaped ceramic body as aforementioned, it was general practice to obtain a desired shape and dimentions by forming an unfired ceramic body before firing by the press molding method, rubber press molding method and the like, and to machine them both before and after the firing the ceramic body.

However, such methods had difficulty in mass production of products having a shape of complicated three dimentional structure, and this had made the costs of the products remarkably higher, thus having made the actual application of various types of ceramic body difficult. So, as the molding method, the following molding methods have been conventionally conducted: the casting molding method wherein a ceramic slurry is cast into a plaster mold to obtain a molded form by utilizing the slip adjacent to the mold and water absorption thereof; the casting molding method wherein said ceramic slurry is cast into a water nonabsorbing mold held being heated at a temperature higher than the caking temperature of the ceramic slurry, then the mold is cooled at a temperature lower than the caking temperature of the ceramic slurry to obtain a molded body or the cast molding method wherein ceramic raw material powders and organic substances are mixed at a high temperature, a flowability is given to make a plastic status, then the mixtures is pressure-cast into a metal mold, thereby molding a ceramic body. (Refer to the patent application laid open NO. 62-257807; patent application laid open NO. 62-289347, patent application laid open NO. 63-30202.)

On the other hand, the cast molding method has generally aimed at acquirement of a shape having a shape having a complicate three dimensional structure by adopting a properly allocated combination type for said mold without distinction of the type of water absorption or non-water absorption of the mold. However, the deflection strength of molded bodies acquired by pouring the ceramic slurry is very low, 2 kg/cm$^2$~3 kg/cm$^2$ or less, and a cracking easily generates on the molded body during taking it out of the mold. Especially the plaster mold of water absorption type has a limit on the dimension accuracy of the mold itself. In addition, if the thickness of the molded form is 1 mm or less, it is impossible to fill the mold with the ceramic slurry even by pressure-casting of the ceramic slurry. So the cast molding method had a weak point in that it was difficult to obtain a high accuracy molded body having no internal defect and molded ceramic body having a shape of thin and complicate three dimensional structure.

The cast molding method wherein the water nonabosorption mold is heated and cooled, also had a weak point in that a heating device and cooling device had to be added to the cast molding device, this made a large type and complicate device, in addition, it took much times to control the heating and cooling of the mold at a correct temperature, and the numbers of molded products per unit time was remarkably small, thus resulted in that the molding efficiency was bad and less reliable molded body could be mass-produced.

On the other hand, the injection method has the following many defects: It can not obtain a fluidity allowing ceramic body to be pressure-cast without addition of a greater amount- 20~30 weight % of organic binders to ceramic powders. Therefore, after molding, this method requires a binder removal process for a very long time for removal of the added organic binders. In addition, the raw density of the molded body is 60% or less- lower, compared that of the fired product, the firing shrinkage is greater and the deformation rate during the shrinkage is also greater.

This method had also the following disadvantages: As the molding materials to which a fluidity was given by using ceramic raw material powders and organic binders is cast under a high pressure into a mold, the cylinder, nozzle of the injection device and the mold are remarkably abraded, the abraded mold components is mixed into the ceramic raw material powders, thus resulting in that the characteristics of the ceramic body are deteriorated after firing the body.

SUMMARY OF THE INVENTION

The present invention was made in consideration of the problems of the conventional molding method, and aims at improving the strength of ceramic molded body to dissolve cracking generation during binder removal processing and make the machining easier, decreasing the amounts of organic binders applied for molding of ceramic molded body to shorten the binder removal time, lessen the firing shrinkage and make it possible to obtain a high accuracy dimension, and thus providing a molding method of ceramic body capable of easy mass production of ceramic molded body having a shape of a thin and complicate three dimentional structure.

DETAILED DESCRIPTION OF THE INVENTION

A molding method of ceramic body according to the present invention is characterized by comprising the following steps of preparing a ceramic slurry by adding, to ceramic raw material powders, hydrocarbon organic compounds as as solvent, a nonionic surface active agent as organic dispersant, hydroxy fatty acid as a caking agent, or in addition to the solvent, organic dispersant and caking agent, at least one of poly alkylene oxide derivative, fatty acid ester or fatty acid amide as an aid to caking, and high molecular weight compounds having a polar group consisting of amino group, carbonyl group, ester group or hydroxyl group as homogeneous caking accelerator and hydrocarbon organic compounds having at least one of amino group as surface reforming agent and mixing them altogether; and casting the ceramic slurry into a mold, cooling it to a temperature lower than the melting point of the caking agents; and thereafter taking it out of the mold.

In the above composition, as hydroxy fatty acid is applied as a caking agent, ceramic slurry can be caked at a room temperature, ceramics molded body has a high strength and its handling becomes very easier.

Application of hydrocarbon organic compounds as a solvent makes it possible to lessen the amount of binders starting with a caking agent capable of adding a plasticity to the ceramic slurry, thereby making the binder removal much easier and additionally making it possible to obtain a high dimension accuracy.

Application of nonionic surface active agents as an organic dispersant can prevent partial aggregation of ceramic particles, and additionally improve the particle wetting properties of ceramic body.

Combination use of high molecular weight compounds having a polar group selected from amino group, carbonyl group, carboxyl group and hydroxyl group can prevent crystalization of the caking agent during its caking and that of solvent, and prevent the generation of voids remaining as a trace of vaporization of thermal decompositions fo caking agent and solvent crystals in the fired body.

Combination use of poly alkylene oxide derivatives, fatty acid ester or fatty acid amide as caking agent can improve the strength fo a molded body, efficiently prevent generation of a cracking or chipping on the molded body during taking it out of the mold, and increase a fluidity of ceramic slurry in the mold.

Combination use of hydrocarbon organic compounds having at least one amino group as surface reforming agent can cause this surface reforming agent to adsorb the surface of ceramic raw material powders, especially hydrophilic system oxide ceramic powders, modify the surface of the powders to a hydrophobic system, improve the wetting properties for caking agent, aid to calking, and solvent, make a uniform quality of slurry comprising the oxides ceramic powders, lower the slurry viscosity and lessen the binder amount.

EMBODIMENTS

The following are the detailed description of the embodiments of the present invention.

In the molding method of ceramic body according to the present invention, alumina ($Al_2O_3$), zirconia ($ZrO_2$), silicon nitride ($Si_3N_4$), or silicon carbide (SiC) is applied as ceramic raw materials. Various types of aid to caking with a desired amount is added to raw materials powders such as alumina, silicon nitride or silicon carbide, and stabilizer such as yttria ($Y_2O_3$) with a desired amount is added to raw material powders of zirconia.

The particle diameter of these ceramic raw materials to be properly applied is ranging from a few micron to submicron and a greater particle diameter saves the addition amount of various types of additives to a small amount.

To the ceramic raw material powders, hydrocarbon organic compounds as solvent, nonionic surface active agent as organic dispersant, hydroxy fatty acid as caking agent, or in addition to the solvent, organic dispersant and caking agent, at least any of poly alkylene oxide derivative, fatty acid ester and fatty acid amide as aid to caking, and high molecular weight compounds having a polar group selected from amino group, carbonyl group, ester group and hydroxyl group as homogeneous caking accelerator and hydrocarbon organic compounds having at least one amino group as surface reforming agent are added and then mixed altogether to prepare a ceramic slurry. The slurry is cast into a mold, and then cooled to a temperature lower than the melting point of the caking agent. After then the cast article is taken out of the mold to dry and remove the solvent.

More particularly, the ceramic molding method according to the present invention is as follows.

Initially the solvent, organic dispersant and caking agent of a desired amount, or in addition to the solvent, organic dispersant and caking agent or at least one of aid to caking, homogeneous caking accelerator and surface reforming agent of a desired amount are mixed, and then the mixture is heated to a temperature higher than the melting point of the fatty acid, while the mixture is fully mixed to prepare an adjusted solution.

To the adjusted solution, ceramic raw material powders is added together with homogeneous caking accelerator and surface reforming agent having a desired particle size, then the mixture is heated, while the mixture is fully mixed altogether to make a slurry. In this step, the ceramic particle surface is changed from hydrophilic oil system to hydrophobic oil system, so that the surface is improved, thereby making the cermic slurry having a slow viscosity and high concentration.

Next in order to prevent generation of voids in the ceramic molded body, the ceramic slurry is fully defoaming-treated. Thereafter, the ceramic slurry is injection-molded into a mold held at a fixed temperature. At this time, the fatty acid is homogeneously caked by action of the homogeneous caking accelerators. After the cake is taken out of the mold, the temperature is raised to vaporize the solvent and additionally it is raised to decompose a remove the residual solvent, organic dispersant, caking agent, aid to caking, homogeneous caking accelerator, surface reforming agent and the like, to thereby obtaining a ceramic molded body.

(Embodiment 1)

To mixed raw materials with an addition of powder aid to baking mainly consisting of silica ($SiO_2$), calcia (CaO), and magnesia (MgO) to α-alumina ($Al_2O_3$), added was 17.15 weight % of compound solution wherein, into hydrocarbon organic solvent, mixed had been alkyl amine surface reforming agent, organic dispersant consisting of sorbitan ester system and soritan fatty acid ester system nonionic surface active agent, fatty acid ester aid to caking, caking agent consisting of fatty acid and acryl resin homogeneous caking accelerator, and then while being heated, they were mixed to make a slurry. The viscosity indicated this time by an E type viscosity gauge under the 5 rpm measurement conditions was 120 poise.

Next, the slurry was defoaming-treated for 40~50 minutes by using stirring vacuum defoamer, then pressure-cast into a mold for a cylindrical molded body under a gass pressure of 2 $kg/mm^2$ which had been held beforehand at a prescribed temperature, and has a diameter of 2 mm and a depth of 100 mm, thus being filled up to a 35 mm depth. The slurry was treated in the same way, then pressure-cast into a mold for a disk molded body, under a gas pressure of 2 $kg/mm^2$ which had been held beforehand at a prescribed temperature, and has a diameter of 100 mm and a thickness of 10 mm. A test piece of H 100 mm × W 10 mm × L 40 mm was cut out of the acquired disk molded body and the deflection strength thereof was measured in conformity with the JIS 3 points bending test method, and it was 18~20 kg/cm². Next the molded body was dried to obtain an alumina molded body. The density of this molded body was measured to be 2.31/cm³.

(Embodiment 2)

In the same way as the embodiment 1, to ceramic raw material powders, added was 15.6 weight % of compound solution wherein, into hydrocarbon organic solvent, mixed had been oreyl amine surface reforming agent, organic dispersant consisting of a sorbitan ester system and sorbitan fatty acid ester system nonionic surface active agent, fatty acid ester aid to caking, caking agent cosisting of fatty acid and acryl resin homogeneous caking accelerator, and then while being heated, they were mixed to make a slurry. The viscosity indicated this time by an E type viscosity gauge under the 5 rpm measurement conditions was 45 poise.

This slurry was presence-cast in the same way as the embodiment 1 into a mold for a cylindrical molded body, thus being filled up to a 50 mm depth. In the same way, an alumina molded body was made and the deflection strength was measured to be 14~16 kg/cm². The density was 2.40 g/cm³.

(Embodiment 3)

In the same way as the embodiment 1, to ceramic raw material powders, added was 16.1 weight % of compound solution wherein, into hydrocarbon organic solvent, mixed had been octadecyl amine surface reforming agent, organic dispersant consisting of sorbitan ester system and sorbitan fatty acid ester system nonionic surface active agents, fatty acid ester aid to caking, caking agent consisting of fatty acid and acryl resin homogeneous caking accelerator, and then while being heated, they were mixed to make a slurry.

The viscosity indicated this time by an E type viscosity gauge under the 5 rpm measurement conditions was 60 poise.

This slurry was pressure-cast in the same way as the embodiment 1 into a mold for a cylindrical molded body, thus being filled up to a 43 mm depth. In the same way, an alumina molded body was made and the deflection strength was measured to be, 20~22 kg/cm². The density was 2.37 g/cm³.

(Embodiment 4)

In the same way as the embodiment 1, to ceramic raw material powders, added was 15.3 weight % of compound solution wherein, into hydrocarbon organic solvent, mixed had been biphenyl amine surface reforming agent, organic dispersant consisting of sorbitan ester system and sorbitan fatty aciid ester system nonionic surface active agent, fatty acid ester aid to caking, caking agent consisting of fatty acid and acryl resin homogeneous caking accelerator, and then while being heated, they were mixed to make a slurry.

The viscosity indicated this time by an E type viscosity gauge under the 5 rpm measurement conditions was 80 poise.

This slurry was pressure-cast and poured in the same way as the embodiment 1 into a mold for a cylindrical molded body, thus being filled up to a 39 mm depth. In the same way, an alumina molded body was made and the deflection strength was measured to be 16~18 kg/cm². The density was 2.42 g/cm³.

(Embodiment 5)

To ceramic raw materials powders made by adding 3 mole % of yytrium oxide ($Y_2O_3$) to 97 mole % of zirconia oxide ($ZrO_2$) and mixing them, added was 15.2 weight % of compound solution wherein, into hydrocarbon organic solvent, mixed had been octadecyl amine surface reforming agent, organic dispersant consisting of sorbitan ester system and sorbitan fatty acid ester system nonionic surface active agent, fatty acid ester aid to caking, caking agents consisting of fatty acid and acryl resin homogeneous caking accelerator, and then while being heated, they were mixed to make a slurry. The viscosity indicated this tiime by an E type viscosity gauge under the 5 rpm measurement conditions was 75 poise.

This slurry was pressure-cast in the same way as the embodiment 1 into a mold for a cylindrical molded body, and it was filled up to a 30 mm depth. In the same way, a jirconia molded body was made and the deflection strength was measureed to be 18~20 kg/cm². The density was 3.05 g/cm³.

(Embodiment 6)

In the same way as the embodiment 5, to ceramic raw material powders, added was 14.65 weight % of compound solution wherein, into hydrocarbon organic solvent, mixed had been octadecyl amine surface reforming agent, organic dispersant consisting of sorbitan ester system and sorbitan fatty acid ester system nonionic surface active agent, fatty acid ester aid to caking, caking agent consisting of fatty acid and acryl resin homogeneous caking accelerators, and then while being heated, they were mixed to make a slurry. The viscosity indicated this time by an E type viscosity gauge under the 5 rpm measurement conditions was 60 poise.

This slurry was pressure-cast in the same way as the embodiment 1 into a mold for a cylindrical molded body, thus being filled up to a 43 mm depth. In the same way, a jirconia molded body was made and the deflection strength was measured to be 12~14 kg/cm². The density was 3/10 g/cm³.

(Embodiment 7)

In the same way as the embodiment 5, to ceramic raw material powders, added was 13.65 weight % of compound solution wherein, into hydrocarbon organic solvent, mixed had been phenyl amine surface reforming agent, organic dispersant consisting of sorbitan ester system and sorbitan fatty acid ester system nonionic surface active agent, fatty acid ester aid to caking, caking agent consisting of fatty acid and acryl resin homogeneous caking accelerator, and then while being heated, they were mixed to make a slurry. The viscosity indicated this time by an E type viscosity gauge under the 5 rpm measurement conditions was 70 poise.

This slurry was pressure-cast in the same way as the embodiment 1 into a mold for a cylindrical molded body, thus being filled up to a 43 mm depth. In the same way, a jirconia molded body was made and the deflection strength was measured to be 14~16 kg/cm². The density was 3.20 g/cm³.

(Embodiment 8)

In the same way as the embodiment 5, to ceramic raw material powders, added was 35 weight % of compound solution wherein, into hydrocarbon organic solvent, mixed had been organic dispersant consisting of sorbitan ester system and sorbitan fatty acid ester system nonionic surface active agents, aid to caking consisting of poly alkylene oxide derivative, caking agent consisting of hydroxy fatty acid, and then while being heated, they were mixed to make a slurry. The viscosity indicated this time by an E type viscosity gauge under the 5 rpm measurement conditions was 55 poise.

This slurry was pressure-cast in the same way as the embodiment 1 into a mold for a cylindrical molded body, thus being filled up to a 48 mm depth. In the same way, a jirconia molded body was made and the deflection strength was measured to be 11~15 kg/cm$^2$. The density was 3.03 g/cm$^3$.

(Embodiment 9)

In the same way as the embodiment 5, to ceramic raw material powders, added was 29.5 weight % of compound solution wherein, into hydrocarbon organic solvent, mixed had been organic dispersant consisting of sorbitan ester system and sorbitan fatty acid ester system nonionic surface active agent and caking agent consisting of hydroxy fatty acid and then while being heated, they were mixed to make a slurry. The viscosity indicated this time by an E viscosity gauge under the 5 rpm measurement conditions was 50 poise.

This slurry was pressure-cast in the same way as the embodiment 1 into a mold for a cylindrical molded body, thus being filled upon to a 49 m depth. In the same way, a jirconia molded body was made and the deflection strength was measured to be 14~19 kg/cm$^2$. The density was 3.01 g/cm$^3$.

(Embodiment 10)

In the same way as the embodiment 5, to ceramic raw material powders, added was 30.5 weight % of compound solution wherein, into hydrocarbon organic solvent, mixed had been organic dispersant consisting of a sorbitan ester system and sorbitan fatty acid ester system nonionic surface active agent, caking agent consisting for hydroxy fatty acid and carboxylic acid, and then while being heated, they were mixed to make a slurry. The viscosity indicated this time by an E type viscosity gauge under the 5 rpm measurement conditions was 50 poise.

This slurry was pressure-cast in the same way as the embodiment 1 into a mold for a cylindrical molded body, thus being filled up to a 39 mm depth. In the same way, a jirconia molded body was made and the deflection strength was measured to be 10~14 kg/cm$^2$. The density was 3.01 g/cm$^3$.

(Embodiment 11)

To ceramic raw materials powders made by adding ytterbium oxide (Yb$_2$O$_3$) and tangsten oxide (WO$_3$) to silicon nitride (Si$_3$N$_4$), added was 17.9 weight % of compound solution wherein, into hydrocarbon organic solvent, mixed had been organic dispersants consisting of sorbitan ester system and sorbitan fatty acid ester system nonionic surface active agent, caking agent consisting of hydroxy fatty acid, acryl resin homogeneous caking accelerator and fatty acid ester to aid to caking, and then while being heated, they were mixed to make a slurry. The viscosity indicated this time by an E type viscosity gauge under the 5 rpm measurement conditions was 35 poise.

This slurry was pressure-cast in the same way as the embodiment 1 into a mold for a cylindrical molded body, thus being filled up to a 45 mm depth. In the same way, a silicon nitride molded body was made and the deflection strangth was measured to be 28~30 kg/cm$^2$. The density was 1.99 g/cm$^3$.

(Embodiment 12)

In the same way as the embodiment 11, to ceramic raw material powders, added was 19.7 weight % of compound solution wherein, into hydrocarbon organic solvent, mixed had been organic dispersant consisting of sorbitan ester system and sorbitan fatty acid ester system nonionic surface active agent, caking agent consisting of hydroxy fatty acid, acryl resin homogeneous caking accelerator and fatty acid ester aid to caking, and then while being heated, they were mixed to make a slurry. The viscosity inidicated this time by an E type viscosity gauge under the 5 rpm measurement conditions was 35 poise.

This slurry was pressure-cast in the same way as the embodiment 1 into a mold for a cylindrical molded body, thus being filled up to a 70 mm depth. In the same way, a silicon nitrige molded body was made and the deflection strength was measured to be 27~30 kg/cm$^2$. The density was 2.00 g/cm$^3$.

(Embodiment 13)

In the same way as the embodiment 11, to ceramic raw material powders, added was 17.1 weight % of compound solution wherein, into hydrocarbon organic solvent, mixed had been organic dispersant consisting of sorbitan ester system and sorbitan fatty acid ester system nonionic surface active agant, caking agent consisting of hydroxy fatty acid, acryl resin homogeneous caking accelerator and fatty acid ester aid to caking, and then while being heated, they were mixed to make a slurry. The viscosity indicated this time by an E type viscosity gauge under the 5 rpm measurement conditions was 75 poise.

This slurry was pressure-cast in the same way as the embodiment 1 into a mold for a cylindrical molded body, thus being filled up to a 41 mm depth. In the same way, a silicon nitride molded body was made and the deflection strength was measured to be 28~30 kg/cm$^2$. The density was 1.99 g/cm$^3$.

(Embodiment 14)

In the same way as the embodiment 11, to ceramic raw material powders, added was 17 weight % of compound solution wherein, into hydrocarbon organic solvent, mixed had been organic dispersant consistinf of sorbitan ester system and sorbitan fatty acid ester system nonionic surface active agent, caking agent consisting of hydroxy fatty acid, acryl resin homogeneous caking accelerator and acryl acid ester aid to caking, and then while being heated, they were mixed to make a slurry. The viscosity indicated this time by an E type viscosity gauge under the 5 rpm measurement conditions was 35 poise.

This slurry was pressure-cast in the same way as the embodiment 1 into a mold for a cylindrical molded body, thus being filled up to a 63 mm depth. In the same way, a silicon nitride molded body was made and the deflection strength was measured to be 29~32 kg/cm$^2$. The density was 2.00 g/cm$^3$.

(Embodiment 15)

In the same way as the embodiment 11, to ceramic raw material powders, added was 15.9 weight % of compound solution wherein, into hydrocarbon organic solvent, mixed had been organic dispersant consisting of sorbitan ester system and sorbitan fatty acid ester system nonionic surface active agent, caking agent consisting of hydroxy fatty acid, acryl resin homogeneous caking accelerator and acryl acid ester aid to caking, and then while being heated, they were mixed to make a slurry. The viscosity indicated this time by an E type viscosity gauge under the 5 rpm measurement conditions was 60 poise.

This slurry was pressure-cast in the same way as the embodiment 1 into a mold for a cylindrical molded body, thus being filled up to a 43 mm depth. In the same way, a silicon nitride molded body was made and the deflection strength was measured to be 20~23 kg/cm$^2$. The density was 2.01 g/cm$^3$.

(Embodiment 16)

In the same way as the embodiment 11, to ceramic raw material powders, added was 22.8 weight % of compound solution wherein, into hydrocarbon organic solvent, mixed had been organic dispersant consisting of sorbitan ester system and sorbitan fatty acid ester system nonionic surface active agent, caking agent consisting of hydroxy fatty acid, carboxyl acid amide homogeneous caking accelerator and then while being heated, they wer mixed to make a slurry. The viscosity indicated this time by an E type viscosity gauge under the 5 rpm measurement conditions was 120 poise.

This slurry was pressure-cast in the same way as the embodiment 1 into a mold for a cylindrical molded body, thus being filled up to a 35 mm depth. In the same way, a silicon nitride molded body was made and the deflection strength was measured to be 21~25 kg/cm$^2$. The density was 2.00 g/cm$^3$.

(Embodiment 17)

To ceramic raw material powders made by adding yttrium oxide ($Y_2O_3$), strontium ($SrCO_3$), aluminium nitride (AlN) and tangsten oxide ($WO_3$) to silicon nitride ($Si_3N_4$), added was 21.0 weight % of compound solution wherein, into hydrocarbon organic solvent, mixed had been hydrocarbon organic solvent, organic dispersannt consisting of sorbitan ester system and sorbitan fatty acid ester system nonionic surface active agent, caking agennt consisting of hydroxy fatty acid, and then while being heated, they were mixed to make a slurry. The viscosity indicated this time by an E type viscosity gauge under the 5 rpm measurment conditions was 25 poise.

This slurry was pressure-cast in the same way as the embodiment 1 into a mold for a cylindrical molded body, thus being filled up to a 75 mm depth. In the same way, a silicon nitride molded body was made and the deflection strength was measured to be 26~29 kg/cm$^2$. The density was 2.01/cm$^3$.

(Embodiment 18)

To ceramic raw material powders made by adding boron (B) and carbon (C) to silicon carbide (SiC), added was 40 weight % of compound solution wherein, into hydrocarbon organic solvent, mixed had been organic dispersant consisting of sorbitan ester system non-ionic surface active agent, caking agent consisting of hydroxy fatty acid, and then while being heated, they were mixed to make a slurry. The viscosity indicated this time by an E type viscosity gauge under the 5 rpm measurement conditions was 45 poise.

This slurry was pressure-cast in the same way as the embodiment 1 into a mold for a cylindrical molded body, thus being filled up to a 48 mm depth. In the same way, a silicon nitride molded body was made and the deflection strength was measured to be 26~30 kg/cm$^2$. The density was 2.05/cm$^3$.

(Embodiment 19)

In the same way as the embodiment 18, to ceramic raw material powders, added was 33.9 weight % of compound solution wherein, into hydrocarbon organic solvent, mixed had been organic dispersant consisting of sorbitan ester system and sorbitan fatty acid ester system nonionic surface active agent and caking agent consisting of hydroxy fatty acid, and then while being heated, they were mixed to make a slurry. The viscosity indicated this time by an E type viscosity gauge under the 5 rpm measurment conditions was 65 poise.

This slurry was pressure-cast in the same way as the embodiment 1 into a mold for a cylindrical molded body, thus being filled up to a 33 mm depth. In the same way, a silicon nitride molded body was made and the deflection strength was measured to be 20~24 kg/cm$^2$. The density was 2.03 g/cm$^3$.

(Embodiment 20)

In the same way as the embodiment 18, to ceramic raw material powders, added was 36.4 weight % of compound solution wherein, into hydrocarbon organic solvent, mixed had been organic dispersant consisting of sorbitan ester system and sorbitan fatty acid ester system nonionic surface active agent, caking agent consisting of hydroxy fatty acid and carboxyl acid amide homogeneous caking accelerator, and then while being heated, they were mixed to make a slurry. The viscosity indicated this time by an E type viscosity gauge under the 5 rpm measurement conditions was 40 poise.

This slurry was pressure-cast in the same way as the embodiment 1 into a mold for a cylindrical molded body, thus being filled up to a 53 mm depth. In the same way, a silicon nitride molded body was made and the deflection strength was measured to be 20~24 kg/cm$^2$. The density was 2.05 g/cm$^3$.

As apparent from the embodiment, in the molding method of ceramic body according to the present invention, hydrocarbon organic solvent for making a slurry is added in order to give a plasticity to a ceramic slurry, lessen the application amount of other binders, and liquid paraffin is suitably applied.

If the addition amount of this hydrocarbon organic solvents is 4 weight % or less, the binder volume increases and slurrying becomes difficult. If the volume is 19 weight % or more, the density and strength of a molded body decrease. So 15 weight % or less, favourably 10 weight % or less is desirable.

A small quantity of hydrocarbon organic solvents is sufficient in the case of application of high class hydrocarbon having a comparatively greater number of carbons as surface reforming agents.

Next, hydroxy fatty acid as caking agent cakes a ceramic slurry at a room temperature, and 12-hydroxy fatty acid is suitable. As 12-hydroxy fatty acid, stearic acid, sabinine acid, iprolic acid, arulit acid, ricinolic acid are suitable.

If the addition amount of this hydroxy fatty acid is 0.1 weight % or less to ceramic raw material powders, the caking of a ceramic slurry becomes insufficient. If the volume is 10 weight % or more, its binder removal becomes difficult.

Nonionic surface active agent as organic dispersant is applied for prevention of ceramic particles' aggregation, and there are the following types of active agent: sorbitan ester system, sorbitan fatty acid ester system, multifunctional ester system, polyoxyl alkylene alkyl ether system, amine and phosphate ester system active agents. The proper combination thereof makes it possible to obtain a favorable result.

If the addition volume of organic dispersants is 0.05 weight % or less to ceramic raw material, a dispersion effect can not be acquired and the viscosity becomes higher, thus making slurrying impossible. If the amount is 5.5 weight % or more, the strength of a molded form becomes low, unsuitable.

Homogeneous caking accelerators prevents crystalization of said caking agents during its caking, and carbon acid amides, acryl resin and the like are suitable.

If the addition amount of this homogeneous caking accelerator is 0.1 weight % or less to ceramics raw materials, no preventive effect for crystalization of caking agents and solvents is recognized. If the volume is 5 weight % or more, the viscosity gets higher, slurrying becomes difficult and the strength of a molded form is remarkably low, thus resulting in that it is impractical.

Aid to caking improves the strength of a molded form and prevents cracking and chipping during its taking out of the mold, and poly alkylene oxide derivatives, fatty acid ester and fatty acid amide are suitable.

If the addition amount of this aid to caking is 0.1 weight % or less to ceramics raw materials, there is no effect on the improvement of the strength of a molded body. If the volume is 10 weight % or more, the density of the molded body gets low. So 8 weight % or less is desirable.

Surface reforming agent adsorbs the surface of hydrophilic ceramic powders to improve it in quality to a hydrophobic surface, and improve the wetting properties of solvents and ceramic powders. As hydrocarbon compounds having one or more amino group, saturated hydrocarbon compounds, unsaturated hydrocarbon compounds, hydrocarbon compounds wherein one hydrogen atom of these hydrocarbons was displaced by an amino group are applied and the followings are the examples thereof: amine derivatives such as decyl amine, dodecyl amine, tetra decyl amine, hexadecyl amine, octadecyl amine and oreyl amine, amine derivatives having 2 or more amino groups.

The addition amount of this surface reforming agents is required to comply with the ratio surface area of ceramic powders, and the 1.5~6 weight % to ceramic raw materials is proper also for lessening of a slurry viscosity.

As aforementioned, the molded method according to the present invention is capable of conducting the following advantages; a) shortening of the binder removal time by decrease of the amount of organic binder applied for molding of ceramic body; b) provision of ceramic body capable of acquiring a high dimension accuracy by diminishing the firing shrinkage; c) dissolution of cracking during taking the cast body out of a mold; d) facilitation of machining; e) easy mass-production of thin, complicated ceramic molded body having a three dimensional structure shape by improvement of the strength of ceramic molded body; f) easy mass-production of uniform ceramic molded body having a higher strength, higher density and higher dimension accuracy.

We claim:

1. A method of molding a ceramic body comprising the steps of:
   (a) preparing a ceramic slurry by admixing ceramic raw material powders, a solvent, an organic dispersant, a caking agent, a homogeneous caking accelerator, and a surface reforming agent, wherein the solvent is a hydrocarbon organic compound, the organic dispersant is a nonionic surface active agent, the caking agent is a hydroxy fatty acid, the homogeneous caking accelerator is a high molecular weight compound having a polar group selected from amino, carbonyl, ester and hydroxyl and the surface active agent is a hydrocarbon compound having at least one amino group;
   (b) casting said ceramic slurry into a mold;
   (c) cooling the molded ceramic to a temperature lower than the melting point of said caking agent; and
   (d) removing the ceramic body from the mold.

2. The method according to claim 1 wherein in step (a) the admixture further comprises an aid to caking.

3. The method according to claim 2 wherein said aid to caking is selected from the group consisting of polyalkylene oxide derivatives, fatty acid esters, and fatty acids amides.

* * * * *